R. R. BEERS.
SAW FILING MACHINE.
APPLICATION FILED JAN. 22, 1914.
1,131,030.
Patented Mar. 9, 1915.
4 SHEETS—SHEET 1.
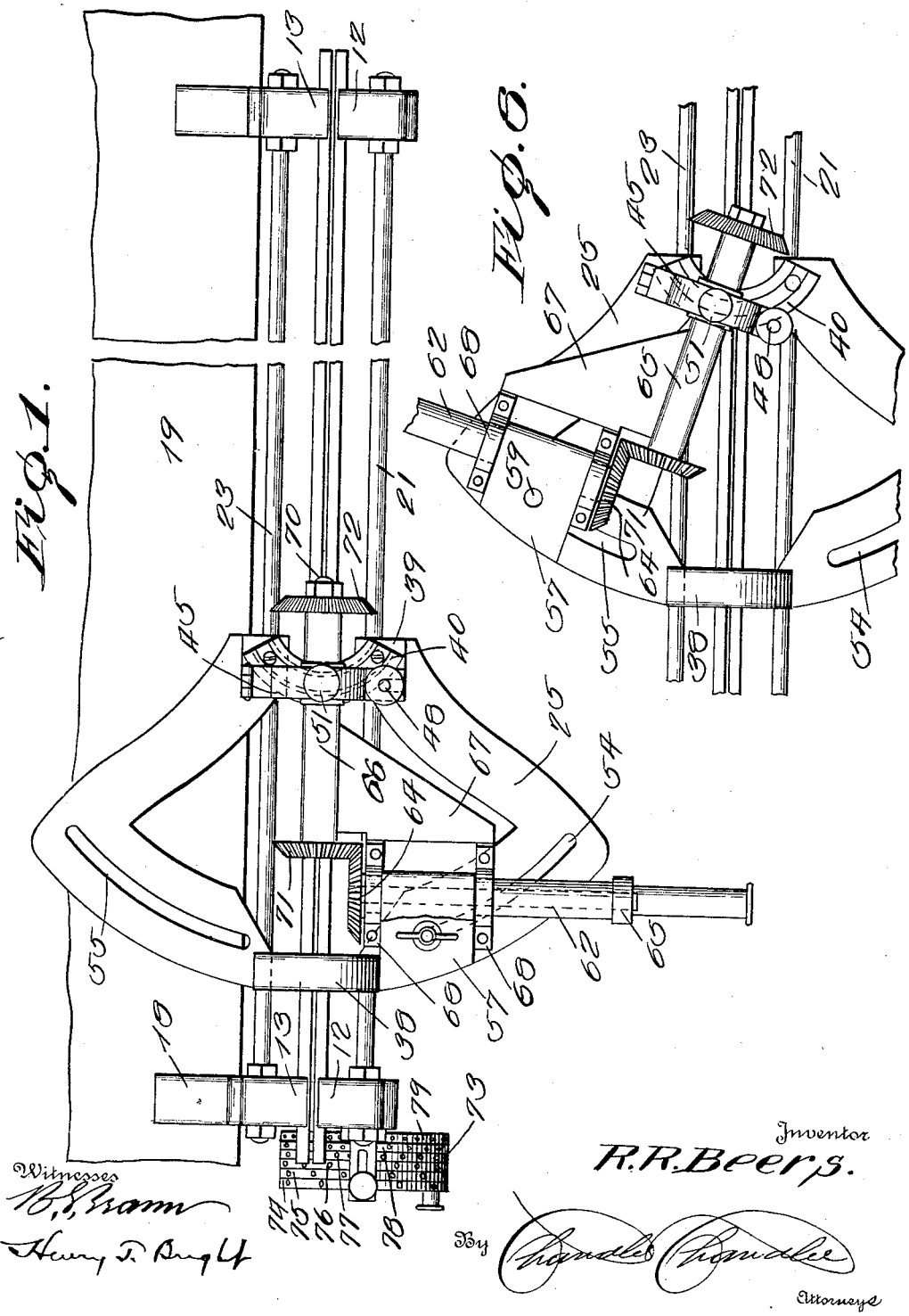

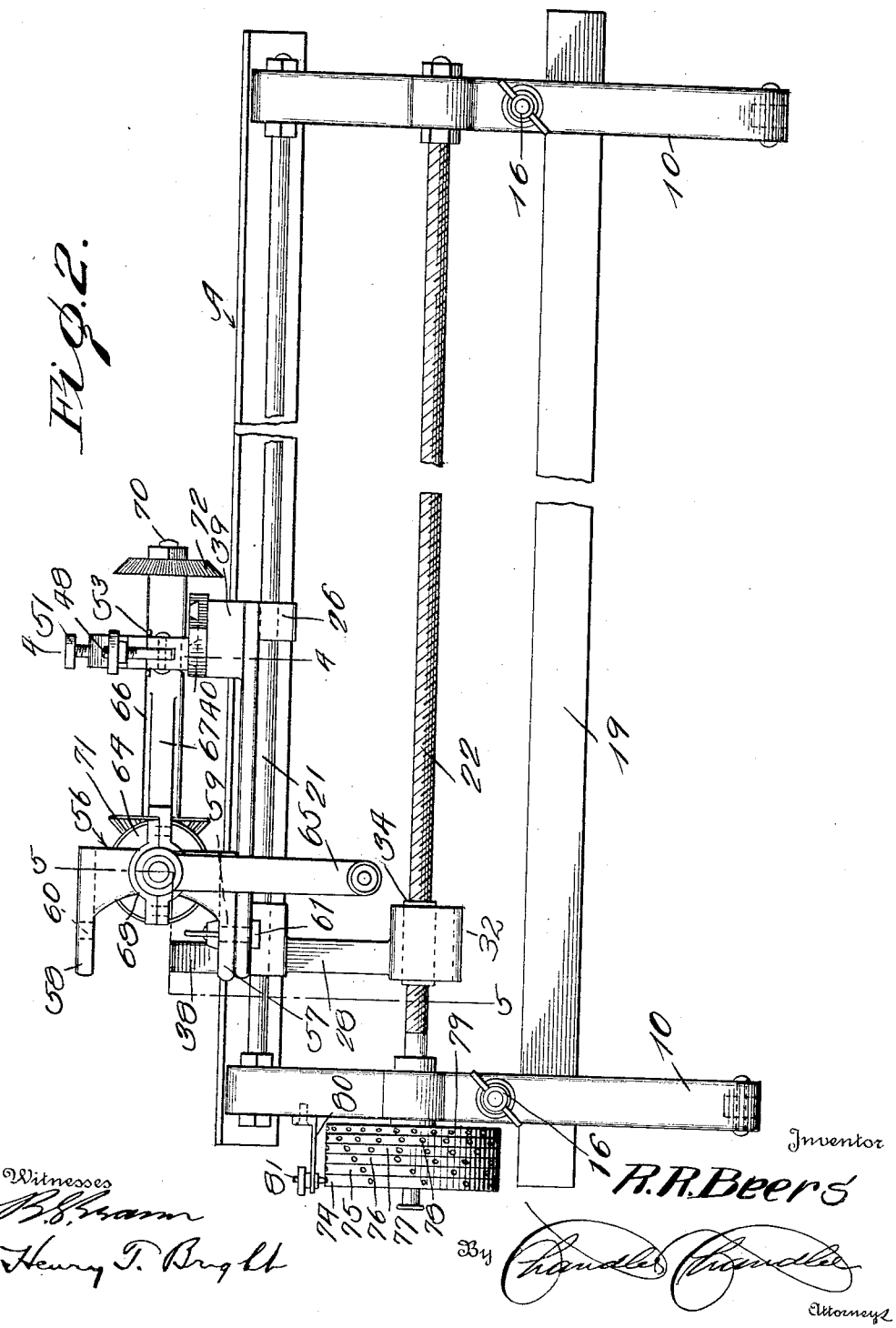

R. R. BEERS.
SAW FILING MACHINE.
APPLICATION FILED JAN. 22, 1914.
1,131,030.
Patented Mar. 9, 1915.
4 SHEETS—SHEET 3.
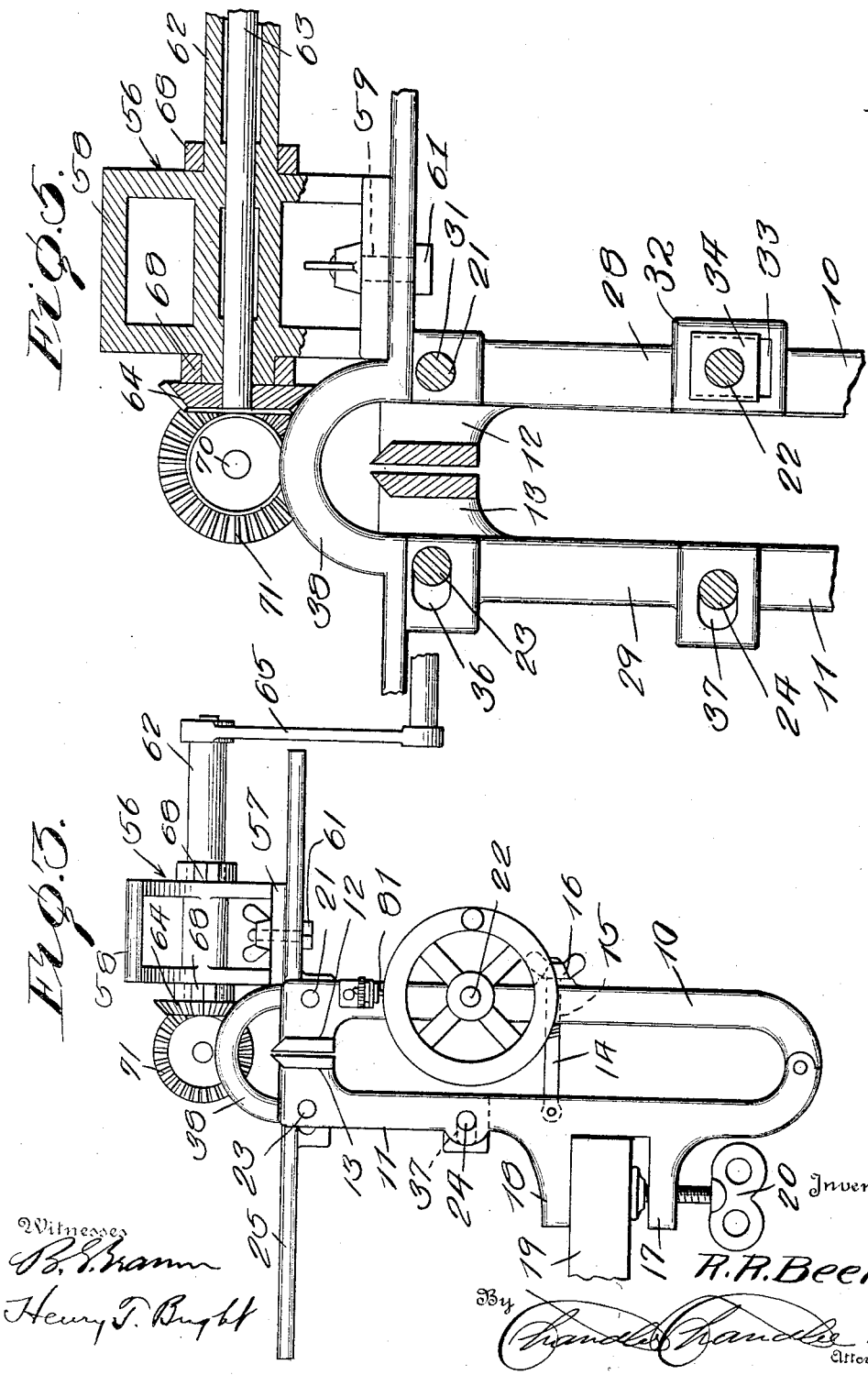

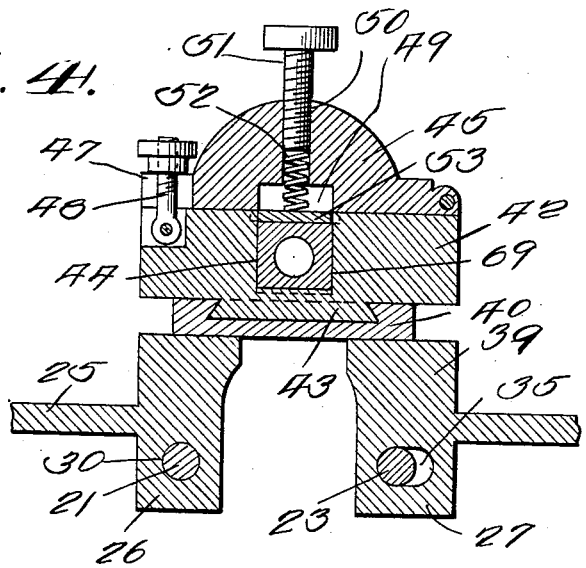

UNITED STATES PATENT OFFICE.

ROY R. BEERS, OF TULSA, OKLAHOMA.

SAW-FILING MACHINE.

1,131,030.  Specification of Letters Patent.  Patented Mar. 9, 1915.

Application filed January 22, 1914. Serial No. 813,752.

*To all whom it may concern:*

Be it known that I, ROY R. BEERS, a citizen of the United States, residing at Tulsa, in the county of Tulsa, State of Oklahoma, have invented certain new and useful Improvements in Saw-Filing Machines; and I do hereby declare the following to be a full, clear, and exact description of the invention, such as will enable others skilled in the art to which it appertains to make and use the same.

This invention relates to saw filing machines which are particularly adapted for sharpening carpenters' saws.

The object of the invention resides in the provision of a saw filing machine which embodies an improved construction whereby the teeth of the saw will be positively maintained the same size throughout and in addition will maintain the bevel of the various teeth the same.

A further object of the invention resides in the provision of a machine of the character named wherein the file element can be adjusted to meet the requirements of the particular saw being filed and in which the file element can be easily elevated out of engagement with the teeth of the saw when it is desired to move said element relatively to the saw.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a saw filing machine constructed in accordance with the invention; Fig. 2, a side elevation of same; Fig. 3, an end view of the machine; Fig. 4, a section on the line 4—4 of Fig. 2; Fig. 5, a section on the line 5—5 of Fig. 2; Fig. 6, a perspective view of a fragment of the file carrying head; Fig. 7, a perspective view of a fragment of the carrier, said fragment being positioned correspondingly to the fragment of the file carrying head shown in Fig. 6, and Fig. 8, a partial plan view with the head in reverse position from what is shown in Fig. 1.

Referring to the drawing the machine is shown as comprising a saw clamping element A which embodies at each end U-shaped members including hingedly connected arms 10 and 11. The arms 10 are connected at their free ends by a clamping jaw 12, while the arms 11 are connected at their free ends by a clamping jaw 13 adapted to coöperate with the jaw 12 for the purpose of securing a saw therebetween. Secured to each arm 11 and extending laterally therefrom is a rod 14 which passes through a transverse opening 15 in the adjacent arm 10 and has threaded on its free end a nut 16 through the manipulation of which the jaws 12 and 13 may be clamped upon a saw blade as will be obvious. Projecting laterally from each arm 11 oppositely to the rod 14 are spaced arms 17 and 18 which are adapted to receive therebetween a supporting part 19. Mounted in each arm 17 is a clamping screw 20 which is adapted to coöperate with the supporting part 19 to secure the machine as a whole thereto. Connecting the free ends of the arms 10 is a guide rod 21, and journaled in said arms is a feed screw 22. Connecting the free ends of the arms 11 is a guide rod 23, while another guide rod 24 connects the arms 11 inwardly of the guide rod 23.

The invention further comprises a carrier 25 which is provided with relatively short front legs 26 and 27 and relatively long rear legs 28 and 29. The legs 26 and 28 are provided respectively with alined passages 30 and 31 through which is slidably engaged the guide rod 21. The lower end of the leg 28 is enlarged as at 32 and provided with an opening 33 in which is mounted an interiorly threaded block 34 engaged on the feed screw 22. The leg 27 and the leg 29 are provided with alined passages 35 and 36 respectively through which is slidably engaged the guide rod 23. The passages 35 and 36 are considerably wider than the diameter of the guide rod 23 for a purpose that will presently appear. The leg 29 is provided at its lower end with a passage 37 through which is slidably engaged the guide rod 24. This passage 37 is considerably wider than the diameter of the guide rod 24, which condition taken in connection with the width of the passages 35 and 36 will permit the arms 10 and 11 to be operated for the purpose of moving the jaws 12 and 13 away from each other to release a saw blade. The carrier 25 is provided at its rear end with an arched portion 38 whereby same will clear the teeth of a saw blade during the longitudinal movement of the carrier on the guide rods 21, 23, 24 and on the feed screw 22. The carrier 25 is provided at its forward end with an upward extension 39 and secured to the top face of this extension is a plate 40 provided with an arcuate dovetailed groove 41. Disposed upon the plate 40 is a block 42 provided on its lower side with a dove-tailed tongue 43 slidably engaged in the groove 41. The block 42 is provided in its upper edge with a recess 44 for a purpose that will presently appear. Pivotally mounted upon the block 42 for movement in a plane transversely of the machine is a keeper element 45 the free end of which is provided with a recess 47 adapted to receive a clamping screw 48 pivoted on the block 42 and whereby said keeper member may be locked against pivotal movement. The side of the keeper member 45 adjacent the block 42 is provided with a recess 49 which mates with the recess 44 when the keeper member is locked against pivotal movement by the screw 48. The keeper member 45 is provided with a threaded passage 50 in which is engaged a screw 51 and also a spring 52, one end of said spring bearing against the screw 51 and the other end against a follower plate 53 slidable in the recesses 44 and 49. The carrier 25 is provided at its rear end with arcuate slots 54 and 55 disposed respectively on opposite sides of the machine and arranged concentric to the groove 41.

Disposed upon the carrier 25 is a head 56 provided at opposite ends with lateral flanges 57 and 58 having openings 59 and 60 therein respectively. The head 56 is shown secured to the carrier 25 by means of a clamping screw 61 engaged through the slot 54 and opening 59. Extending transversely through the head 56 is a bushing 62 in which is rotatably mounted a shaft 63. Fixed on the inner end of the shaft 63 is a beveled gear 64 and fixed on the outer end of said shaft is an operating crank 65. Extending longitudinally of the machine is a sleeve 66 provided with a lateral extension 67. This extension 67 is provided with arms 68 which are rotatably engaged upon the bushing 62 on opposite sides of the head 56 and whereby the sleeve 66 is rendered movable in a vertical plane. The sleeve 66 is provided with a squared intermediate portion 69 slidable in the recesses 44 and 49 and upon the upper sides of which squared portion is engaged the follower plate 53. Rotatably mounted in the sleeve 56 is a shaft 70 upon the rear end of which is fixed a beveled gear 71 meshing with the beveled gear 64. On the forward end of the shaft 70 is fixed a file disk 72 for engagement with the teeth of a saw blade. It will be apparent that the spring 52 normally holds the file disk 72 in operative position but that said file disk can be elevated against the influence of the spring 52 above the teeth of a saw blade to allow longitudinal movement of the carrier 25. It will also be apparent that the angularity of the disk 72 with respect to a saw blade can be varied by releasing the clamping screw 61 and sliding said screw and the tongue 43 in the slot 54 and groove 41 respectively. The position of the head 56 and the disk 72 may be reversed by inverting the head 56 so as to dispose the flange 58 in engagement with the carrier 25 and then engaging the screw 61 through the slot 55 and opening 60. During this operation the keeper member is thrown back to permit removal of the sleeve 66 from and subsequent reapplication to the recess 44.

In order to move the carrier 25 and the filing disk 72 the proper distance after each filing operation to engage the disk with the next tooth to be filed there is fixed on the feed screw 22 a disk 73 having its periphery provided with a plurality of series of circumferentially arranged recesses 74, 75, 76, 77, 78 and 79, the recesses of each series being disposed equal distances apart and the recesses of one series being disposed a different distance apart than the recesses of another series. Mounted upon the arm 10 adjacent the disk 73 above said disk is a bracket 80 in which is adjustably mounted for movement longitudinally of the disk 73 a spring pin 81 adapted to engage successively in the recesses of a given series as the disk 73 is rotated, the series of recesses with which the pin is adapted to engage being dependent upon the setting of the pin. The distance apart of the recesses of a given series is such that when the disk 73 is rotated the distance between adjacent recesses the feed screw 22 will be rotated to move the carrier 25 the requisite distance to dispose the filing disk 72 in operative relation to the next tooth of the saw blade when the operating crank 25 can be manipulated to rotate the disk 72 as will be obvious. When a saw blade is clamped in the machine it is necessary of course to set the pin 81 in operative relation to the series of recesses in the disk 73 which corresponds to the size of the teeth of the particular saw blade.

What is claimed is:—

1. In a saw filing machine, the combination of clamping member comprising spaced U-shaped members having their arms hingedly connected, clamping jaws connecting the free ends of corresponding arms of said members, guide rods connecting corresponding arms of said members, a carrier, depending legs on said carrier at the front and rear ends thereof respectively, corresponding front and rear legs of said carrier being provided with alined openings through which the guide rods are slidably engaged, the alined openings in corresponding front and rear legs on one side of the carrier being wider than the diameter of the guide rods engaged therethrough whereby the free ends of the arms of the U-shaped members may be moved a limited distance away from each other, a rotatable filing element mounted on the carrier, and means for rotating said element.

2. In a saw filing machine, the combination of a saw clamping mechanism, a carrier slidable on said clamping mechanism, a feed screw journaled on said clamping mechanism, a leg depending from the carrier, a block carried by said leg and engaged on the feed screw, a disk fixed on said feed screw and having a plurality of series of circumferentially arranged recesses, a bracket mounted upon the clamping mechanism, a pin adjustable on said bracket to engage successively in the recesses of a given series of recesses during the rotation of the disk, a filing element rotatably mounted on the carrier, and means for rotating said filing element.

3. In a saw filing machine the combination of a saw clamping mechanism, a carrier slidably adjustable on said saw clamping mechanism, said carrier being provided with an arcuate groove, a frame slidable in said groove whereby same may be adjusted into different angular relations with respect to a saw blade carried by the clamping mechanism, a bearing yieldingly mounted in said frame, a shaft journaled in said bearing, means for rotating the shaft, and a filing element fixed on said shaft.

In testimony whereof, I affix my signature, in the presence of two witnesses.

ROY R. BEERS.

Witnesses:
H. G. COOPER,
J. T. COOPER.

Copies of this patent may be obtained for five cents each, by addressing the "Commissioner of Patents, Washington, D. C."